(12) United States Patent
Cooksey et al.

(10) Patent No.: US 6,193,004 B1
(45) Date of Patent: Feb. 27, 2001

(54) MOTORCYCLE EXHAUST SYSTEM

(75) Inventors: Charles K. Cooksey, Menomonee Falls; William Crowe, Wauwatosa; Andrew D. Massignan, Hubertus, all of WI (US)

(73) Assignee: Harley-Davidson Motor Company, Milwaukee, WI (US)

( * ) Notice: Subject to any disclaimer, the term of this patent is extended or adjusted under 35 U.S.C. 154(b) by 0 days.

(21) Appl. No.: 09/363,402

(22) Filed: Jul. 29, 1999

(51) Int. Cl.⁷ .................................................... B62D 61/02
(52) U.S. Cl. ............................................ 180/219; 181/228
(58) Field of Search ................................... 181/227, 228, 181/247, 248, 264; 180/219, 225, 309; D12/194, 110

(56) References Cited

U.S. PATENT DOCUMENTS

| | | | |
|---|---|---|---|
| 4,359,126 | * 11/1982 | Aiba ..................................... | 180/219 |
| 4,359,865 | * 11/1982 | Nakao et al. ......................... | 60/313 |
| 4,487,288 | * 12/1984 | Watanabe et al. ................... | 181/238 |
| 4,815,554 | * 3/1989 | Hara et al. ........................... | 180/219 |
| 4,860,538 | * 8/1989 | Takeuchi ............................. | 180/219 |

OTHER PUBLICATIONS 1993 and 1994 XLH Models Service Manual—pp. 2–64 and 2–65.

1997 J & P Cycles Catalog—pp. 23–42.

Yahama Star 1998 Catalog (published prior to Jul. 29, 1998); cover and 2 pages from within the catalog (not numbered).

* cited by examiner

Primary Examiner—Kevin Hurley
Assistant Examiner—Andrew J. Fischer
(74) Attorney, Agent, or Firm—Michael Best & Friedrich LLP

(57) ABSTRACT

An exhaust system includes a support member mounted to a motorcycle frame. First and second exhaust systems are mounted to the support member such that the support member places the first and second exhaust systems in fluid communication with each other.

10 Claims, 4 Drawing Sheets

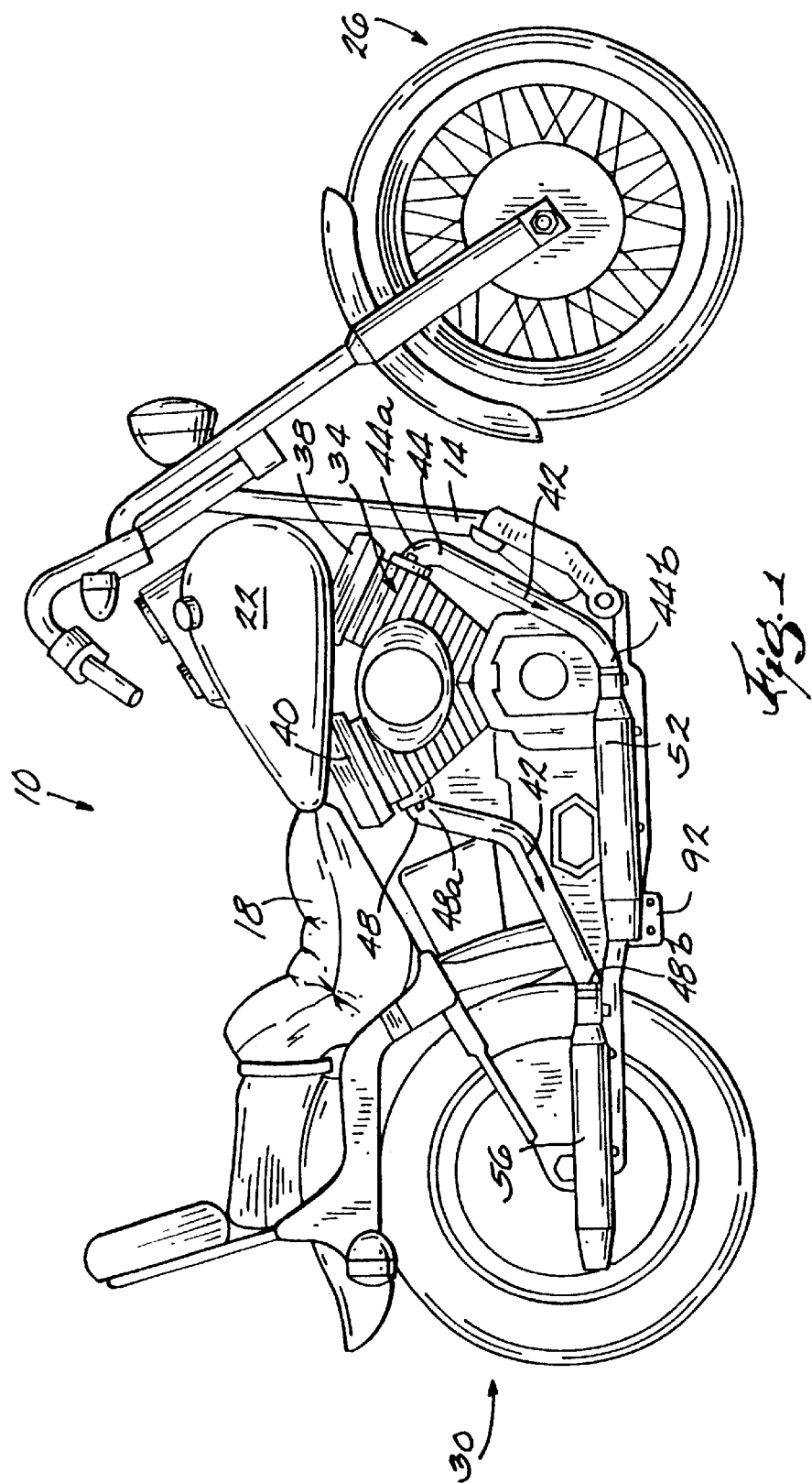

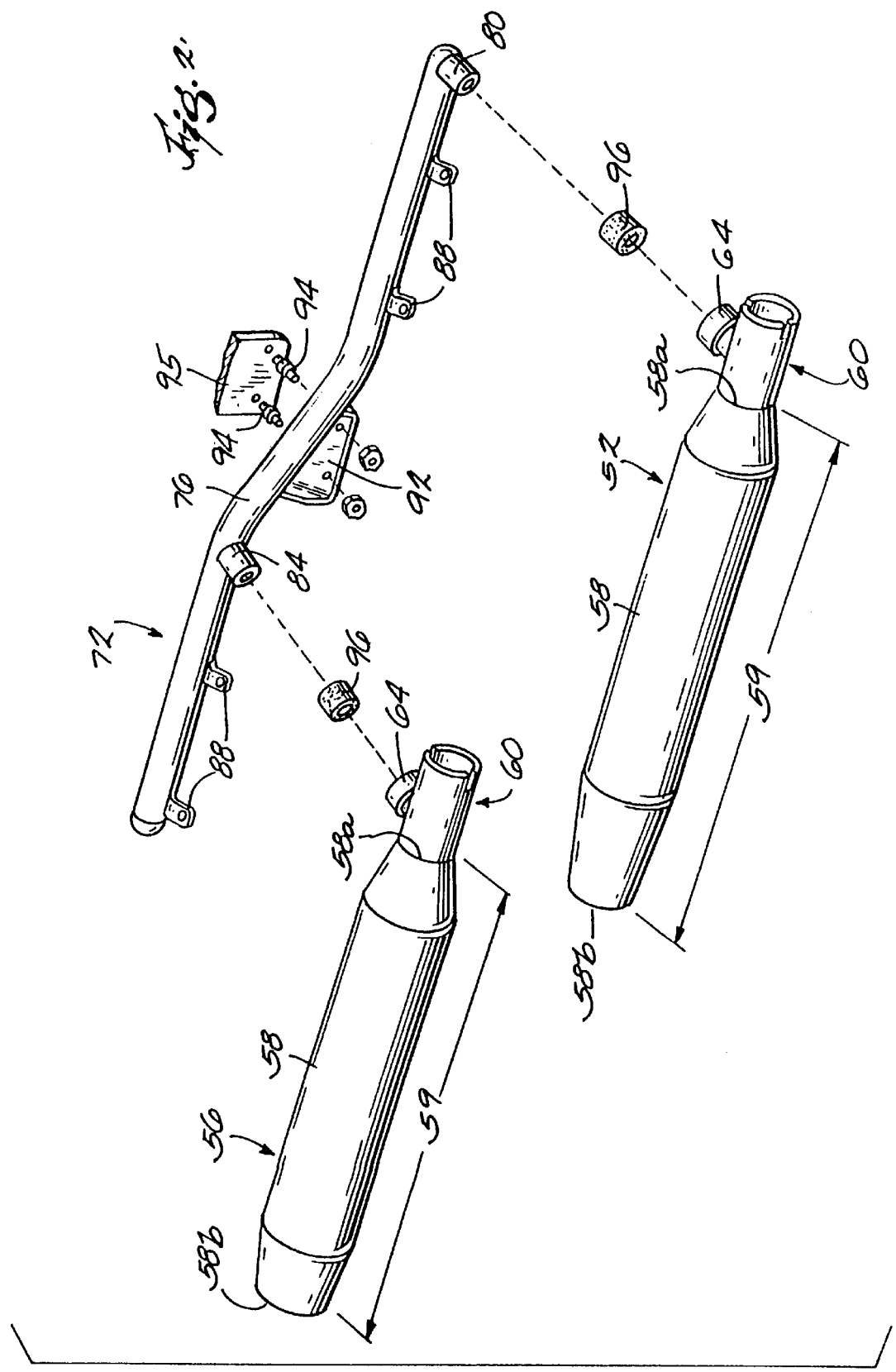

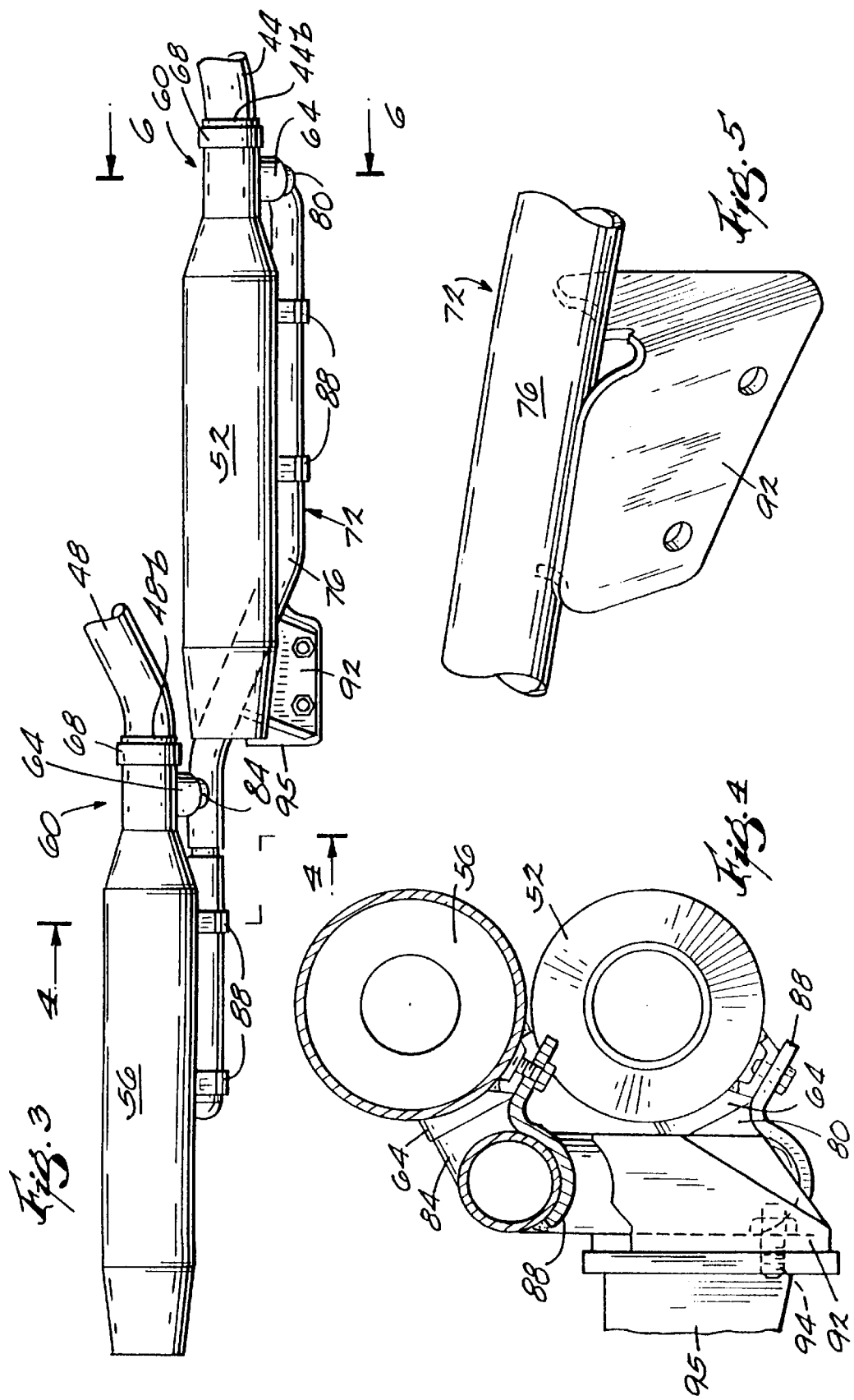

MOTORCYCLE EXHAUST SYSTEM

FIELD OF THE INVENTION

The invention relates to motorcycle exhaust systems.

BACKGROUND

It is known to support motorcycle exhaust systems with brackets mounted to the frame. Each exhaust system typically includes an exhaust pipe and, optionally, a muffler. Typical prior art support brackets support one or more exhaust systems. It is also known to provide cross pipes, distinct from the support brackets, between separate motorcycle exhaust systems to create cross-talk, which improves the efficiency of the exhaust systems. Typical prior art cross pipes extend between two exhaust systems, connecting the exhaust pipes at points remote from the mufflers.

SUMMARY

The present invention involves designing the support bracket of multiple exhaust systems to act as a cross pipe. The basic concept is to combine the support bracket and cross pipe into one component that both supports the exhaust systems and provides cross-talk between the exhaust systems. The invention also involves positioning the support bracket/cross pipe member such that it is substantially hidden from view while the motorcycle is in operation, and such that it does not obstruct a side view of the motorcycle engine.

More specifically, the present invention provides a motorcycle comprising a frame, an engine mounted to the frame and having first and second cylinders, first and second exhaust systems, and a support member mounted to the frame to support the first and second exhaust systems, and including a cross pipe portion in fluid flow communication between the first and second exhaust systems.

Preferably, each exhaust system includes an exhaust pipe and an optional muffler.

Other features and advantages of the invention will become apparent to those skilled in the art upon review of the following detailed description, claims, and drawings.

BRIEF DESCRIPTION OF THE DRAWINGS

FIG. 1 is a side elevational view of a motorcycle embodying the present invention.

FIG. 2 is an exploded view of a portion of the exhaust system.

FIG. 3 is a side elevational view of a portion of the exhaust system.

FIG. 4 is a section view taken along line 4—4 in FIG. 3.

FIG. 5 is an enlarged rear perspective view of a portion of the support member.

Figure 6:
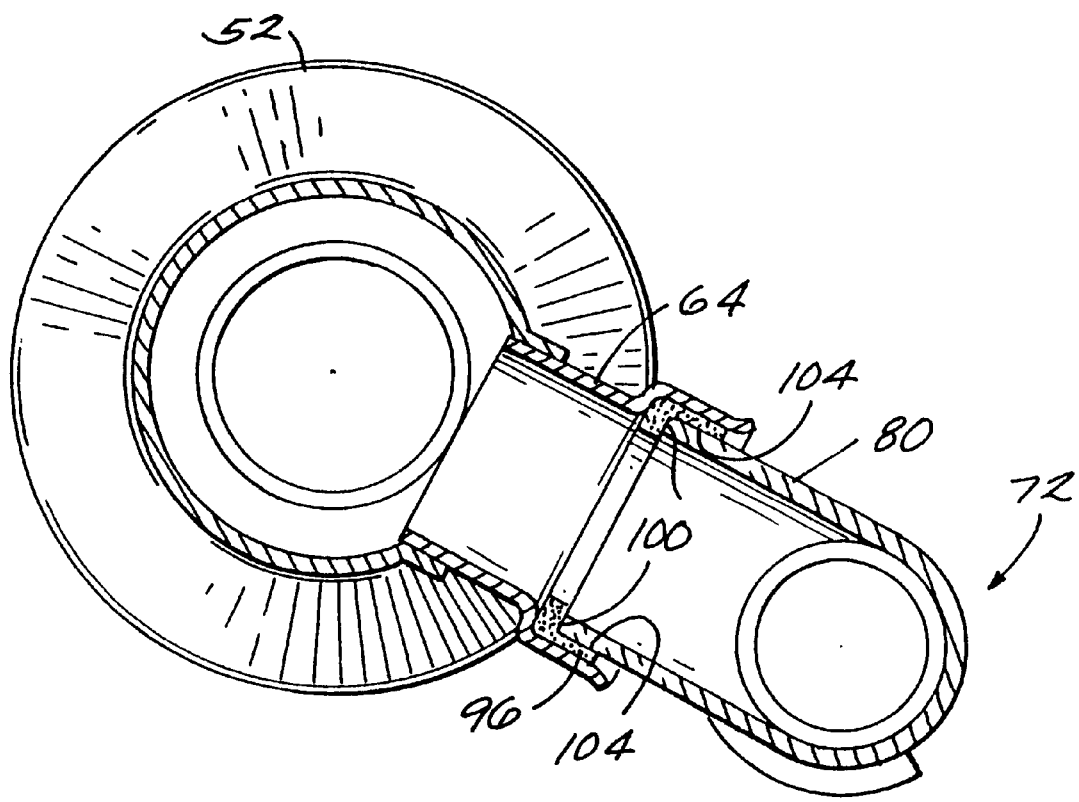
FIG. 6 is a section view taken along line 6—6 in FIG. 3.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify steps of a method or process is simply for identification and is not meant to indicate that the steps should be performed in a particular order.

DETAILED DESCRIPTION

FIG. 1 illustrates a motorcycle 10 including a frame 14. Mounted to the frame 14 are a seat 18, a fuel tank 22, front and rear wheel assemblies 26, 30, and an engine 34. The illustrated engine 34 is V-type two-cylinder four-stroke engine including first and second cylinders 38, 40. The invention may, however, be embodied in engines having more than two cylinders. Each cylinder 38, 40 defines therein a combustion chamber (not shown).

The motorcycle 10 further includes first and second exhaust systems that carry the products of combustion away from the combustion chambers in a downstream direction 42 during the engine exhaust stroke. In the illustrated embodiment, the first and second exhaust systems include first and second exhaust pipes 44, 48 in fluid flow communication with the combustion chambers of the first and second cylinders 38, 40, respectively. The exhaust pipes 44, 48 extend down from the engine 34 and rearwardly with respect to the motorcycle 10 in the downstream direction 42. The exhaust pipes 44, 48 each have an upstream end 44a, 48a, respectively, and a downstream end 44b, 48b, respectively.

Referring to FIGS. 1–4, the illustrated exhaust systems further include first and second mufflers 52, 56 that are associated with the respective first and second exhaust pipes 44, 48. As shown in FIG. 2, each muffler 52, 56 includes a body portion 58 having an upstream end 58a, a downstream end 58b, and a body portion length 59.

Each muffler 52, 56 also includes an exhaust pipe fitting 60 at the upstream end 58a of the body portion 58. The exhaust pipe fittings 60 include a substantially transverse cross pipe fitting 64. The cross pipe fittings 64 may be spaced from the upstream ends 58a of the body portions 58 a distance equal to or less than about 50% of the overall body portion length 59, and preferably as close as possible to the upstream end 58a. Preferably, the cross pipe fittings 64 are substantially immediately upstream of the upstream ends 58a of the body portions 58.

The downstream ends 44b, 48b of the exhaust pipes 44, 48 are slip-fit into the exhaust pipe fittings 60, and the fittings 60 are clamped around the pipes 44, 48 with clamps 68 (FIG. 3). The mufflers 52, 56 provide a controlled path for the downstream flow of exhaust gases to reduce noise emitted from the engine 34 during operation.

A support member 72, best illustrated in FIGS. 2–5, includes a cross pipe portion 76 having first and second support member fittings 80, 84, a plurality of muffler mounting portions 88, and a motorcycle mounting portion (illustrated as a bracket 92). The illustrated cross pipe portion 76 is of smaller diameter than that of the exhaust pipes 44, 48, but the cross pipe diameter may be the same or larger than the diameter of the exhaust pipes 44, 48 in alternative embodiments. The muffler mounting portions 88 are welded or otherwise joined to the cross pipe portion 76 and extend out from the cross pipe portion 76 (see FIG. 4). Each muffler mounting portion 88 includes a hole to accommodate a fastener. The bracket 92 also has mounting holes to accommodate fasteners. The illustrated fasteners are studs 94 having threads on both ends. The illustrated studs 94 are threaded into threaded holes in a lower member 95 of the frame 14, and nuts are threaded onto the opposite end to complete the mount. Of course, many alternative fasteners and mounting systems (e.g., bolts, screws, clips, welding, etc.) may be used to mount the support member 72 to the frame 14.

FIG. 6 illustrates the slip fit junction between the support member fitting 80 and an associated cross pipe fitting 64. As illustrated, a gasket sleeve 96 is provided to create a snug slip-fit between the mufflers 52, 56 and the support member 72. The gasket sleeves 96 are designed to provide a soft gasket joint that does not require a clamp. It is believed that the soft gasket joint may provide a joint with a longer life than one having a hard clamp. When the motorcycle is idling or at rest, the gasket 96 provides a face seal or static seal (indicated with reference numeral 100 in FIG. 6) for the end of the support member fittings 80, 84. When the motorcycle is operating at higher rpm, the ends of the support member fittings 80, 84 separate slightly from the gasket 96, and the static seal is compromised. However, there is a radial seal or dynamic seal (indicated with reference numeral 104) between the periphery of the support member fittings 80, 84 and the gasket 96.

The exhaust assembly is assembled as follows. The bracket 92 of the support member 72 is first mounted to the lower member 95 of the frame 14 with the studs 94. The exhaust pipes 44, 48 are slid into the exhaust pipe fittings 60 and secured thereto with the clamps 68. The cross pipe fittings 64 are then slid over the gaskets 96 and the support member fittings 80, 84, and the under surfaces of the mufflers 52, 56 are mounted to the muffler mounting brackets 88 with the fasteners.

In operation, exhaust gases flow between the first and second exhaust pipes 44, 48 through the cross pipe portion 76 of the support member 72 (also known as "cross-talk"). Cross-talk may be caused by exhaust gas flow characteristics, uneven back pressure in the exhaust pipes 44, 48, a combination of flow characteristics and uneven back pressure, or any other cause. The support member 72 thus serves the dual purpose of supporting the exhaust pipes 44, 48 and mufflers 52, 56, and providing a flow path for cross-talk between the exhaust pipes 44, 48.

Because of the close proximity of the cross pipe fittings 64 to their respective mufflers 52, 56, power can be increased by about 7%, and potentially more depending on a variety of design parameters (e.g., flow characteristics, volume in the exhaust systems, etc.). The support member 72 extends between the mufflers 52, 56 and the motorcycle frame 14, so that the support member 72 is substantially hidden from view by the mufflers 52, 56 and visibility of the engine 10 is maximized.

Also, the exhaust pipes 44, 48 and mufflers 52, 56 are entirely supported by the support member 72 and the connection of the exhaust pipes 44, 48 to the cylinders 38, 40.

What is claimed is:

1. A motorcycle comprising:
    a frame;
    an engine mounted to said frame and having first and second cylinders;
    a first exhaust pipe in communication with said first cylinder;
    a first muffler in communication with said first exhaust pipe, said first exhaust pipe defining a first flow path for exhaust gas from said first cylinder to said first muffler;
    a second exhaust pipe in communication with said second cylinder;
    a second muffler in communication with said second exhaust pipe, said second exhaust pipe defining a second flow path for exhaust gas from said second cylinder to said second muffler; and
    a support member mounted to said frame and supporting said first and second mufflers, said support member including a cross pipe portion defining a flow path between said first and second flow paths such that exhaust gas in said first exhaust pipe is permitted to flow through said cross pipe and into said second muffler, and such that exhaust gas in said second exhaust pipe is permitted to flow through said cross pipe and into said first muffler;
    wherein, said first and second flow paths direct exhaust gas flow from said first and second exhaust pipes to said first and second mufflers, respectively, without passing through said cross pipe;
    and wherein said exhaust pipes and mufflers are supported entirely by said support member and said engine.

2. The motorcycle of claim 1, wherein said support member includes first and second muffler mounting portions to which said first and second mufflers, respectively, are mounted with fasteners.

3. The motorcycle of claim 1, wherein said support member is disposed between said first muffler and said frame and between said second muffler and said frame.

4. The motorcycle of claim 1, wherein each of said first and second mufflers includes a fitting to which said first and second exhaust pipes, respectively, are attached, and wherein said cross pipe portion is in fluid flow communication between said fittings.

5. The motorcycle of claim 4, further comprising a gasket disposed between said fittings and a portion of said mufflers to provide both static and dynamic seals.

6. The motorcycle of claim 1, wherein said cross pipe portion is in fluid flow communication between said first and second exhaust pipes at a point immediately upstream of each of said first and second mufflers.

7. The motorcycle of claim 1, wherein said engine includes only two cylinders.

8. A motorcycle comprising:
    a frame;
    an engine mounted to said frame and having first and second cylinders;
    a first exhaust pipe in communication with said first cylinder;
    a first muffler in communication with said first exhaust pipe, said first exhaust pipe defining a first flow path for exhaust gas from said first cylinder to said first muffler;
    a second exhaust pipe in communication with said second cylinder;
    a second muffler in communication with said second exhaust pipe, said second exhaust pipe defining a second flow path for exhaust gas from said second cylinder to said second muffler; and
    a support member mounted to said frame and supporting said first and second mufflers, said support member including a cross pipe portion defining a flow path between said first and second flow paths such that exhaust gas in said first exhaust pipe is permitted to flow through said cross pipe and into said second muffler, and such that exhaust gas in said second exhaust pipe is permitted to flow through said cross pipe and into said first muffler;
    wherein, said first and second flow paths direct exhaust gas flow from said first and second exhaust pipes to said first and second mufflers, respectively, without passing through said cross pipe;

and wherein said support member is mounted to an undersurface of each of said first and second mufflers.

9. A motorcycle comprising:

a frame;

an engine mounted to said frame and having first and second cylinders;

a first exhaust pipe in communication with said first cylinder;

a first muffler in communication with said first exhaust pipe, said first exhaust pipe defining a first flow path for exhaust gas from said first cylinder to said first muffler;

a second exhaust pipe in communication with said second cylinder;

a second muffler in communication with said second exhaust pipe said second exhaust pipe defining a second flow path for exhaust gas from said second cylinder to said second muffler; and a support member mounted to said frame and supporting said first and second mufflers, said support member including a cross pipe portion defining a flow path between said first and second flow paths such that exhaust gas in said first exhaust pipe is permitted to flow through said cross pipe and into said second muffler, and such that exhaust gas in said second exhaust pipe is permitted to flow through said cross pipe and into said first muffler;

wherein said first and second flow paths direct exhaust gas flow from said first and second exhaust pipes to said first and second mufflers, respectively, without passing through said cross pipe;

and wherein said support member includes a first elongated portion extending substantially parallel to said first muffler and between said first muffler and said frame, and wherein said support member includes a second elongated portion extending substantially parallel to said second muffler and between said second muffler and said frame.

10. A motorcycle comprising:

a frame;

an engine mounted to said frame and having first and second cylinders;

a first exhaust pipe in communication with said first cylinder;

a first muffler including first and second opposite ends and in communication with said first exhaust pipe;

a second exhaust pipe in communication with said second cylinder;

a second muffler including first and second opposite ends and in communication with said second exhaust pipe; and a support member mounted to said frame and supporting said first and second mufflers, said muffler being mounted to said support member between said first and second ends of said first muffler, and said second muffler being mounted to said support member between said first and second ends of said second muffler, said support member including a cross pipe portion defining a flow path between said first and second exhaust pipes.

* * * * *